Sept. 10, 1929.   H. I. MORRIS   1,727,839
TIRE FORMING MATERIAL
Original Filed Dec. 31, 1920
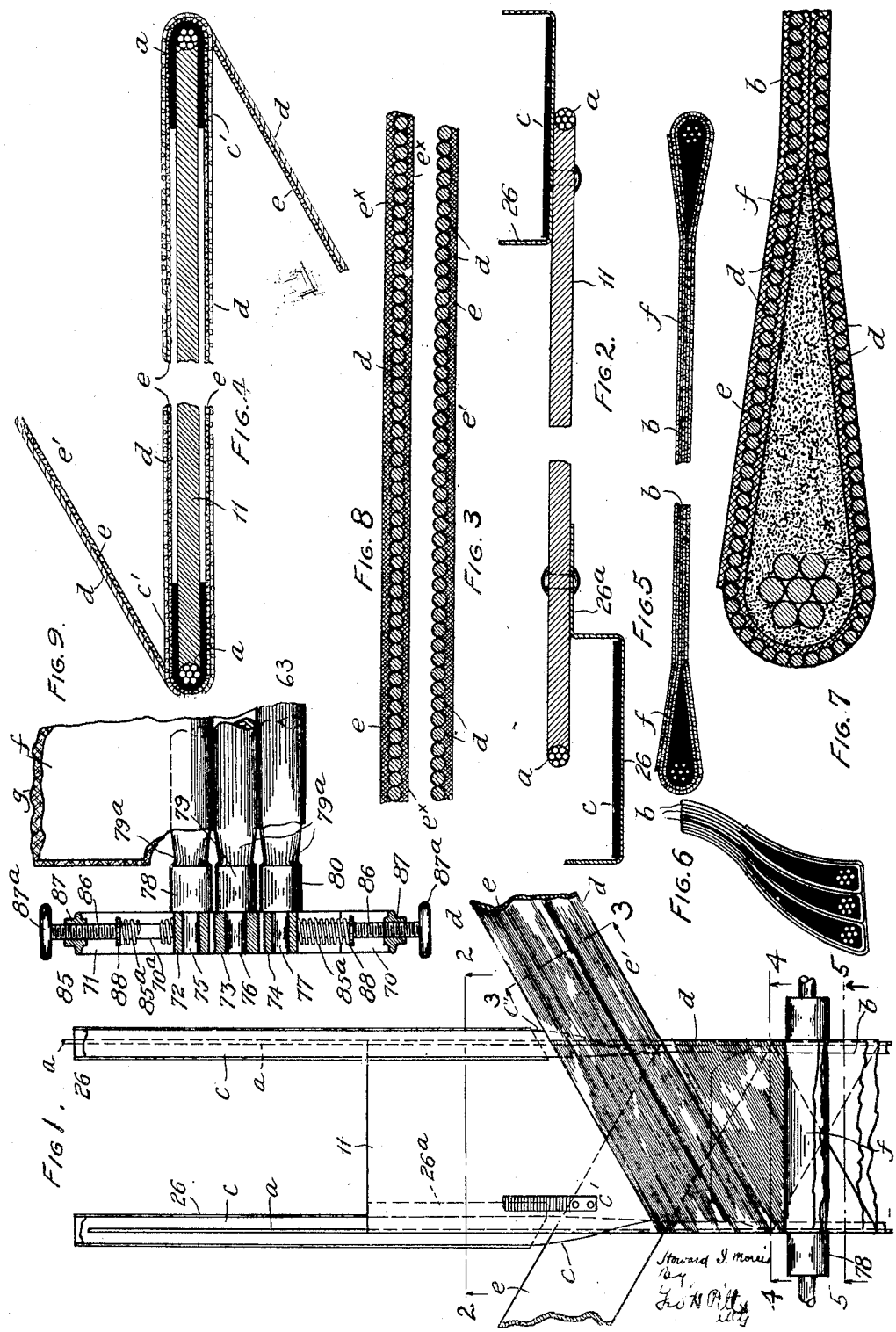

Patented Sept. 10, 1929.

1,727,839

UNITED STATES PATENT OFFICE.

HOWARD I. MORRIS, OF CLEVELAND, OHIO, ASSIGNOR TO THE CORD TIRE MACHINE COMPANY, OF CLEVELAND, OHIO, A CORPORATION OF ARIZONA.

TIRE-FORMING MATERIAL.

Original application filed December 31, 1920, Serial No. 434,244. Divided and this application filed February 17, 1923. Serial No. 619,685.

This invention relates to tire carcasses, more particularly to the material for making them.

This application is a division of my application filed December 31, 1920, Serial No. 434,244.

One object of the invention is to produce tire forming material that is relatively strong and durable and easily applied to a core for making tire carcasses.

Another object of the invention is to produce tire forming material in which those portions thereof that form the bead and side walls of the tire carcass are reinforced to insure strength and durability.

Another object of the invention is to provide a corded tire forming material in which all the materials entering thereinto are uniformly secured together and consolidated to prevent distortion of the cords and insure proper structural characteristics in the tire carcass and durability in the use thereof.

Other objects of the invention will be apparent to those skilled in the art to which my invention relates from the following description taken in connection with the accompanying drawings.

For the purpose of illustration, I have, in the accompanying drawings shown and herein described one form of apparatus embodying my invention.

In the drawings, Fig. 1 is a fragmentary plan view of a machine for making tire forming material embodying my invention.

Fig. 2 is a section, enlarged, on the line 2—2 of Fig. 1.

Fig. 3 is a section, enlarged, on the line 3—3 of Fig. 1.

Fig. 4 is a section, enlarged, on the line 4—4 of Fig. 1.

Fig. 5 is a fragmentary sectional view of the tire forming material on the line 5—5 of Fig. 1, showing the bead material and the filler as these elements are disposed after the tire forming material has been completed.

Fig. 6 is a fragmentary sectional view of a tire carcass showing the disposition of the bead material and the filler therearound after the tire forming material has been applied to a core and the carcass completed.

Fig. 7 is a fragmentary sectional view, enlarged, of the corded rubber ribbon used for making tire forming material being taken on the line 5—5 of Fig. 1.

Fig. 8 is a sectional view, enlarged, of a corded rubber ribbon, but showing a slightly modified form of construction.

Fig. 9 indicates a mechanism for consolidating the tire forming materials.

The tire forming material embodying my present invention is preferably formed on a machine of the type shown in my aforesaid application wherein certain elements of the material are fed from sources of supply in parallel spaced relation and other elements are wrapped helically therearound. Of this machine, a portion of which is shown in Fig. 1, 11 indicates a support preferably mounted in a plane cutting the axis of the shuttle (not shown) which helically wraps or winds certain of the elements around the spaced elements. The opposite side edges of the support serve as a spacer and guide for a pair of bead materials $a$, $a$, and also as a former for certain of the other elements which constitute the tire forming material indicated at $b$, as these elements are associated and correlated with each other ready for consolidation or fabrication. The bead materials $a$, $a$, preferably comprise wire strands, supplied from suitable reels. The beads $a$, $a$, are fed to and along the opposite longitudinal side edges of the former 11, which support the beads $a$, $a$, as the various elements of the tire forming material are being assembled.

$c$, $c$, indicates further bead material, preferably comprising strips of relatively hard rubber, hereinafter referred to as fillers, all supplied from suitably mounted reels and guided by suitable guides 26 in operative relation to the beads $a$, $a$. In the completed web or tire forming material $b$, the fillers surround the strands $a$ and extend inwardly therefrom between the plies or folded portions of the material and thus strengthen the beads and reinforce the side walls of the tire carcass adjacent to the beads, thereby tending to prevent rim cutting when the tire is in use. The fillers $c$, $c$, are fed along with the bead strands $a, a$, in juxtaposition thereto, one strip above one strand and the other strip below the other strand, for reasons which will later be set forth.

26 indicates a pair of guides for the fillers $c, c$. The guides 26 may comprise channel members, whereby their side walls may serve to guide the fillers $c$ in alignment with the beads $a$. The guide 26 for the filler $c$, which is disposed above one of the bead strands $a$, is supported on and fixed to the upper surface of the former 11; whereas the guide 26 for that filler $c$ that is disposed below the other bead strand $a$ is provided along its inner longitudinal side wall with a flange $26^a$, which engages with and is secured to the under side of the former 11 to support the guide 26 in correlation with the adjacent bead strand $a'$. As shown in Figs. 1 and 2, the guides 26 are arranged to support and guide the fillers $c$ relative to the bead strands $a$ so that a portion of each filler, preferably approximately one-half thereof, will be disposed at or extend to either side of the adjacent bead strand 2. As the fillers $c$ leave the free ends of the guides 26 for assembly with the bead strands $a$ that portion of each filler $c$, which extends beyond the adjacent bead strand $a$ is folded over or around the strand and back against the opposite face of the former 11 by cords $d$ (which constitute an integral portion of the tire forming material $b$, as will be later set forth) as shown at $c'$ in Figs. 1 and 4, in position to be pressed against and united with that portion of the filler which extends inwardly from the bead, as will be later described. To permit of this folding operation, the guides 26 terminate slightly rearward of the point where folding over of the fillers $c$ commences (see Fig. 1).

The cords $d$ are fed to the former 11 in a group or groups in parallel relationship, side by side, preferably in contact with each other and fixed to one face of a strip of rubber $e$, being intimately pressed into the material of the strip, whereby there is formed a corded rubber web or ribbon, as shown at $e'$ in Fig. 3, which provides a layer of rubber between adjacent sections of the cords $d$ after the latter are wound and consolidated with the other materials.

The web or webs $e'$ are supplied to the former 11 from opposite sides thereof in correlation with the bead strands $a$ and fillers $c$, whereby these elements may be properly associated or assembled ready for consolidation. The webs $e'$ each have a width approximately one-half that of the material $b$, and in revolving about the former 11, they engage first with the overlying portions of one filler $c$ and then with the overlying portions of the other filler, successively, to fold these portions of the fillers around the strands and against the opposite surfaces of the former 11, as already set forth.

By using a corded rubber web or webs $e'$ and delivering it or them to the strands $a$ and fillers $c$ from a shuttle, I am enabled to provide tire forming material in which all of the cords $d$ are continuous and disposed at any angle to the plane of the tire when the material $b$ is made into carcasses and in which the corded rubber web is helically wound around the fillers as well as the bead material with the bead material embedded in the fillers.

While I prefer to use a corded rubber web $e'$, as shown in Figs. 1 and 3, I may use a web in which the cords $d$ are disposed between two strips of rubber $e^x, e^x$; as shown in Fig. 8.

63 indicates a mechanism for consolidating the various materials $a, a, e'$ and also a rubber strip $f$ when desired, into a unitary web, such as shown at $b$. The consolidating mechanism preferably comprises three superposed rollers 78, 79, 80, respectively, between which the assembled and correlated materials, $a, c, d, e$, and $f$ pass, preferably by two passes (see Fig. 9), to be consolidated into the tire forming material $b$; that is, the materials $a, c, d, e$ and $f$ pass between the rollers 78 and 79, then around the roller 79, then between the rollers 79 and 80, finally, by preference, passing around the roller 80 from which it leads to a device (not shown) on which the tire forming material $b$ is wound. It will be understood that as the materials $a, c, d, e$, and $f$ pass through and between the rollers 78, 79 and 80, they are pressed together or consolidated into intimate relation or a substantially integral unitary structure $b$, as shown in Fig. 5, the folded portions of the fillers $c$ being consolidated into a single mass surrounding and enclosing or embedding the bead strands $a$, as best shown in Figs. 4 and 5.

The rollers 78, 79 and 80 are preferably formed with annular, aligned grooves $79^a$ to receive the opposite edges of the correlated materials which are enlarged on account of the bead strands $a$ and fillers $c$ being disposed therein.

The rollers 78, 79, 80, are mounted at their opposite ends in suitable journal boxes 72, 73, 74, and driven in a suitable manner.

To insure sufficient pressure between the rollers 78, 79 and 80, to effect consolidation of the materials $a, c, d, e$ and $f$, I mount the journal boxes 72 and 74 for the rollers 78 and 80, respectively, so that the latter can be moved or adjusted toward the roller 79. For this purpose the frames 70 are provided with guides $70^a$ which slidably support the journal boxes 72, 74. 85 indicates as an entirety means for moving or adjusting the rollers 78 and 80 toward the roller 79. These means preferably include a coiled spring $85^a$ whereby the pressure is yielding in character. The moving and adjusting means 85 for each journal box for the shafts of the rollers 78 and 80 are similar in construction, hence I will refer to one such means only, as follows: 86 indicates a rod extending through and having screw-threaded engagement with the walls of an opening 87 formed in the end wall of the frame 70 and arranged in the plane of the axes of the rollers 78, 79, 80. The outer end of the rod 86 carries a hand wheel 87$^a$, whereby it may be readily turned; its inner end is provided with a head or seat member 88 to engage the outer end of the spring 85$^a$ interposed between it and the adjacent journal box (72 or 74). From the foregoing description it will be understood that by operating the wheels 87$^a$, the rollers 78 and 80 may be yieldingly pressed against the roller 79 to cause any desired degree of pressure upon the materials $a$, $c$, $d$, $e$ and $f$ to consolidate them into the tire forming material $b$.

These materials may be passed through or between the rollers 78, 79, and then wound on the forming device, but by preference, I pass the materials back through or between the rollers 79, 80, to prevent slippage of the materials relative to each other and to insure feeding of the materials at the same speed and a complete and more uniform consolidation into a unitary web of material.

The forming device may consist of a drum or reel on which the tire forming material may be wound, but by preference I use a tire carcass core and wind the material $b$ thereon, causing it to rotate once for each ply of material which is to constitute the carcass.

In operating the machine, the supply reels or spools for the materials $a$, $c$, $d$, $e$ and $f$ are placed in position and the free ends of the materials positioned and correlated on the former 11 with their free ends between the rollers 78, 79, 80, which being driven, will, on application of the power, draw the materials forwardly and unwind them from their spools. Due to the fact that the spools for the webs $e'$ revolve about the former 11 and feed the latter at an angle thereto, the cords $d$ and webs $e$ will be helically wound or wrapped around the former 11, spaced bead strands $a$ and fillers $c$, and in such operation the webs $e'$ will engage the fillers $c$ and fold their overlying portions over and around the bead strands $a$. The former 11 terminates at a point in front of the position at which the webs $e'$ engage the bead strands $a$ and fillers $c$, so that the correlated materials may pass directly to and between the consolidating rollers 78, 79, 80.

By my construction I am enabled to provide a continuous supply of each of the materials and to conduct substantially all thereof to a position or station where they are arranged in proper correlated position for consolidation. As a result thereof, the machine operates to form into a unitary web of indefinite length all of the materials necessary for the making of a complete tire carcass.

As the materials are all drawn forwardly at the same rate of speed and the cords $d$ are wrapped continuously around the bead strands $a$, the resulting product is uniformly constructed and devoid of strains and stresses throughout its length; and further, as the cords are in helical formation and compressed into a unitary structure without being cut along the line of fold I am enabled to provide a web of material of indefinite length in which all of the cords are continuous from end to end thereof. Furthermore, as the cords surround the bead strands, the material can be effectively applied to the core without danger of the bead strands becoming detached from the body portion of the material. As the material $b$ constitutes and includes all of the materials necessary for a tire carcass, it can be rapidly and economically made into tire carcasses with all of the plies thereof uniformly applied.

It will further be noted that the former 11 is of substantially rectangular shape in cross section and of a thickness approximately equal to the diameter of the bead strands $a$. As a result of such arrangement, the cords $d$ when wound therearound are in a flattened helical formation with the bead strands adjacent to and within the folded portions of the cords; also, since the cords are wound around the bead strands, while the latter are held in spaced relationship by the former 11, the cords are uniformly applied to and relatively tight around the bead strands and against the opposite flat faces of the former 11, thus positioning the cords $d$, as well as the strip $e$, for consolidation devoid of wrinkles and unevenness to the end that a better and more uniform product results. The side edges of the unitary web are not cut or trimmed prior to or after the web is applied to the core. Thus all waste of material is eliminated; furthermore, this arrangement serves to form a bead lock for each bead strand, as well as to provide bound edges for the web, eliminating all danger of the bead strands being displaced or blown out of the tire carcass.

It will also be noted that the strips of bead material $c$ are of a width to extend around and embed the bead strands and inwardly a considerable distance from the bead strands. By this arrangement it will be seen that the strips serve as fillers to reinforce and strengthen those portions of the web $b$ which form the side walls of the tire carcass, so that when the latter is in use, the fillers tend to prevent flexing of the side walls at points adjacent to the opposite side edges of the wheel rim and to that extent overcome or tend to overcome rim cutting.

Where the web $b$ is made relatively narrow, for instance in making the smaller sizes of tire carcasses, I may omit the bead strands $a$. In such construction, the strips of bead material $c$, $c$, are folded over the edges of the former 11 by the cords $d$ or web $e'$ and then consolidated with the latter by the consolidating mechanism 63, as already described.

To those skilled in the art of making articles of the class described, many alterations in construction and widely differing embodiments and applications of my invention will suggest themselves, without departing from the spirit and scope thereof. My disclosures and the description herein are purely illustrative and are not intended to be in any sense limiting.

What I claim is:

1. Corded tire forming material comprising spaced bead material, fillers in which the spaced bead material are embedded, and a corded rubber web helically wound around said bead material and fillers, and consolidated therewith into a unitary structure for forming tire carcasses.

2. Corded tire forming material comprising spaced bead material, fillers in which the spaced bead material are embedded, and a corded rubber web helically wound around said bead material and fillers, said bead material, fillers and opposite portions of the web being consolidated into a unitary structure for forming tire carcasses.

3. Corded tire forming material comprising spaced wire strands, rubber fillers in which the spaced strands are embedded, and a corded rubber web helically wound around said strands and fillers and consolidated therewith into a unitary structure for forming tire carcasses.

4. Corded tire forming material comprising spaced bead material, fillers in which the spaced bead material are embedded, and a corded rubber web consisting of a rubber strip and a plurality of cords arranged side by side, extending longitudinally of the strip and pressed into the material thereof to prevent spreading of the cords, said web being helically wound around said bead material and fillers and consolidated therewith into a unitary structure for forming tire carcasses.

5. Corded tire forming material comprising spaced bead material, fillers in which the spaced bead material are embedded, and a corded rubber web consisting of a pair of rubber strips and a plurality of cords arranged between the strips, extending longitudinally thereof and pressed into the material of the strips to prevent spreading of the cords, said web being helically wound around said bead material and fillers and consolidated therewith into a unitary structure for forming tire carcasses.

6. Corded tire forming material comprising spaced bead material, fillers in which the spaced bead material are embedded, and a corded rubber web consisting of a rubber strip and a plurality of cords arranged side by side and extending longitudinally of the strip, said web being helically wound around said spaced bead material and fillers and consolidated therewith into a unitary structure for forming tire carcasses.

7. Tire forming material comprising spaced bead material, fillers in which the spaced bead material are embedded, and a web helically wound around said bead material and fillers and consolidated therewith into a unitary structure adapted for use in forming tire carcasses.

8. Tire forming material comprising spaced bead material, fillers in which the spaced bead material are embedded, and a rubber web helically wound around said bead material and fillers and consolidated therewith into a unitary structure adapted for use in forming tire carcasses.

In testimony whereof, I have hereunto affixed my signature.

HOWARD I. MORRIS.